United States Patent
Lim et al.

(10) Patent No.: US 12,533,932 B2
(45) Date of Patent: Jan. 27, 2026

(54) ROOF AIR VENT FOR VEHICLE

(71) Applicant: NIFCO KOREA INC., Asan-si Chungcheongnam-do (KR)

(72) Inventors: Yang Mook Lim, Asan-si Chungcheongnam-do (KR); Byung Gi Cho, Asan-si Chungcheongnam-do (KR)

(73) Assignee: Nifco Korea Inc., Asan-si (KR)

( * ) Notice: Subject to any disclaimer, the term of this patent is extended or adjusted under 35 U.S.C. 154(b) by 634 days.

(21) Appl. No.: 17/776,753

(22) PCT Filed: Sep. 10, 2020

(86) PCT No.: PCT/KR2020/012228
§ 371 (c)(1),
(2) Date: May 23, 2023

(87) PCT Pub. No.: WO2021/096045
PCT Pub. Date: May 20, 2021

(65) Prior Publication Data
US 2023/0278402 A1    Sep. 7, 2023

(30) Foreign Application Priority Data
Nov. 15, 2019 (KR) ......................... 10-2019-0146942

(51) Int. Cl.
*B60H 1/24* (2006.01)
*B60H 1/34* (2006.01)
(52) U.S. Cl.
CPC ........... *B60H 1/3428* (2013.01); *B60H 1/245* (2013.01)
(58) Field of Classification Search
CPC .. B60H 1/3428; B60H 1/245; B60H 1/00871; B60H 1/34; B60H 1/00671; B60H 1/00678; B60H 1/00685
(Continued)

(56) References Cited

U.S. PATENT DOCUMENTS

2011/0092149 A1* 4/2011 Spamer ................ B60H 1/3428
454/155
2013/0306760 A1  11/2013 Banschbach
(Continued)

FOREIGN PATENT DOCUMENTS

DE      10056955 A1    6/2001
EP      2018986 A2     1/2009
(Continued)

OTHER PUBLICATIONS

Inagaki, Noriyuki, JP2015147442 Translation.pdf, "Register", Aug. 2015, pp. 1-74.*
(Continued)

*Primary Examiner* — Avinash A Savani
*Assistant Examiner* — Ryan L Faulkner
(74) *Attorney, Agent, or Firm* — KDW Firm PLLC

(57) ABSTRACT

The present invention relates to a roof air vent for a vehicle and, more specifically, to a roof air vent which permits a passenger onboard the vehicle to conveniently control, as needed, a wide distribution of air being supplied into the vehicle through the roof air vent. The roof air vent comprises: an outer bezel (110) which has an air flow hole (111) penetrated in the central portion thereof and has a mounting hole (112) penetrated in an outer region of the air flow hole (111); a spacer ring (160) which is mounted in the air flow hole (111); a plurality of vanes (140), each of which has both lateral ends rotatably coupled to a hinge shaft (161) formed on the inner surface of the spacer ring (160); a link (150) which connects one vane (140) to another vane (140) so as to allow the plurality of vanes (140) to simultaneously rotate about the hinge shaft (161); an inner bezel (120) which is mounted so as to be able to vertically enter and exit the mounting hole (112) formed in the outer region of the air flow hole (111); and a cover (170) which is mounted on the
(Continued)

upper part of the outer bezel (110) so as to prevent the inner bezel (120) and the spacer ring (160) from being separated from the air flow hole (111) and the mounting hole (112), respectively.

3 Claims, 7 Drawing Sheets

(58) Field of Classification Search
USPC .......................................................... 454/155
See application file for complete search history.

(56) References Cited

U.S. PATENT DOCUMENTS

| | | | |
|---|---|---|---|
| 2018/0126825 A1* | 5/2018 | Lee ...................... | B60H 1/3428 |
| 2019/0309982 A1* | 10/2019 | Shimajiri ................ | F24F 13/15 |
| 2020/0156446 A1* | 5/2020 | Youn ..................... | B60H 1/345 |

FOREIGN PATENT DOCUMENTS

| | | | |
|---|---|---|---|
| JP | 2004237854 A | | 8/2004 |
| JP | 2011148353 A | | 8/2011 |
| JP | 2015147442 A | | 8/2015 |
| KR | 1019980008664 A | | 4/1998 |
| KR | 20160057201 A | | 5/2016 |
| KR | 101705178 B1 | | 2/2017 |

OTHER PUBLICATIONS

International Search Report and Written Opinion for PCT/KR2020/012228, mailed Mar. 3, 2021.

* cited by examiner

ROOF AIR VENT FOR VEHICLE

TECHNICAL FIELD

The present disclosure relates to a roof air vent for a vehicle and, more specifically, to a roof air vent which permits a passenger on board the vehicle to conveniently control, as needed, a wide distribution of air being supplied into the vehicle through the roof air vent.

BACKGROUND ART

In general, roof air vents for automobiles are installed in several locations, such as the front and back of a sunroof headlining, to distribute air to passengers in the rear seats (2nd and 3rd rows) of the vehicle. Warm air from the heater is supplied to the interior of the vehicle at a low temperature in winter and cool air from the air conditioner is supplied to the interior of the vehicle at a hot temperature in summer to ensure that passengers may be on board comfortably without being affected by the outdoor temperature.

In a conventional roof air vent for a vehicle, a passenger on board a vehicle controls the amount of opening and closing vanes to adjust the amount and direction of air discharged into the vehicle.

However, the conventional roof air vent for the vehicle supplies air directly to the head of the passenger in the seat, causing some issues, such as headaches during a long trip, discomfort due to wind-blown hair, and the inability to widely distribute air inside the vehicle through the roof air vent without directly supplying the air to the passenger.

Republic of Korea Patent Publication No. 10-1998-0008664 (published date: Apr. 30, 1998) discloses an example of the conventional art.

DISCLOSURE OF THE INVENTION

Technical Goals

To solve such issues, an aspect provides a roof air vent for a vehicle which includes an outer bezel installed in a distribution hole, wherein vanes connected by links operate so that an inner bezel having a blade on its outer surface may insert and draw out downward depending on a rotation direction of the blade. The roof air vent draws out the inner bezel to the bottom of the outer bezel so that a passenger on board a vehicle may conveniently control, as needed, the vanes to supply air directly to their head through the roof air vent or diffuse the air widely inside the vehicle.

Another object of the present disclosure is to allow the passenger to visually identify whether the air supplied to the interior of the vehicle through the roof air vent is in a diffusion state or a non-diffusion state and conveniently change, as needed, the air supplied to the interior of the vehicle through the roof air vent into the diffusion state or the non-diffusion state.

Technical Solutions

The present disclosure for achieving the above object includes an outer bezel 110, which has an air flow hole 111 penetrating the central portion thereof and a mounting hole 112 in an outer region of the air flow hole 111;
a spacer ring 160, which is mounted in the air flow hole 111;
a plurality of vanes 140, each of which has both lateral ends rotatably coupled to a hinge shaft 161 formed on the inner surface of the spacer ring 160;
a link 150, which connects one vane 140 to another vane 140 so as to allow the plurality of vanes 140 to simultaneously rotate about the hinge shaft 161;
an inner bezel 120, which is mounted so as to be able to vertically enter and exit the mounting hole 112 in the outer region of the air flow hole 111;
and a cover 170, which is mounted on the upper part of the outer bezel 110 so as to prevent the inner bezel 120 and the spacer ring 160 from separating from the air flow hole 111 and the mounting hole 112, respectively. The present disclosure is achieved by a guide protrusion 121 and a guide hole 113, wherein the guide protrusion 121 is on the outer surface of the inner bezel 120 vertically entering and exiting the mounting hole 112, and the guide hole 113 is in the outer surface of the outer bezel 110 and guides the guide protrusion 121 entering the guide hole 113.

It is made clear that when a blade 130 is installed on the outer surface of the inner bezel 120 having the guide protrusion 121 formed bulgingly to induce the air distribution and the inner bezel 120 exits the mounting hole 112 to be exposed to the lower part of the outer bezel 110, it is more desirable the air supplied inside the vehicle through the mounting hole 112 spreads more widely and effectively.

In addition, it is made clear that it is more desirable that an operation protrusion 122 is on the bottom part of the inner bezel 120, which enters and exits the mounting hole 112 and the passenger on board the vehicle applies weight to the operation protrusion 122 in one direction or the other direction while holding the operation protrusion 122 by hand to move the guide protrusion 121 along the guide hole 113 so that the inner bezel 120 may enter and exit mounting hole 112.

Advantageous Effects

The present disclosure is useful in making it convenient for a passenger on board a vehicle, as needed, to change the air supplied to the interior of the vehicle into a diffusion state or a non-diffusion state by controlling the inner bezel and vanes. The passenger may conveniently change, as needed, the air supplied to the interior of the vehicle into a diffusion state or a non-diffusion state, while visually identifying the air diffusion state.

BEST MODE FOR CARRYING OUT THE INVENTION

Hereinafter, the technical configuration of the present disclosure will be described in detail with reference to the accompanying drawings.

Figure 1:
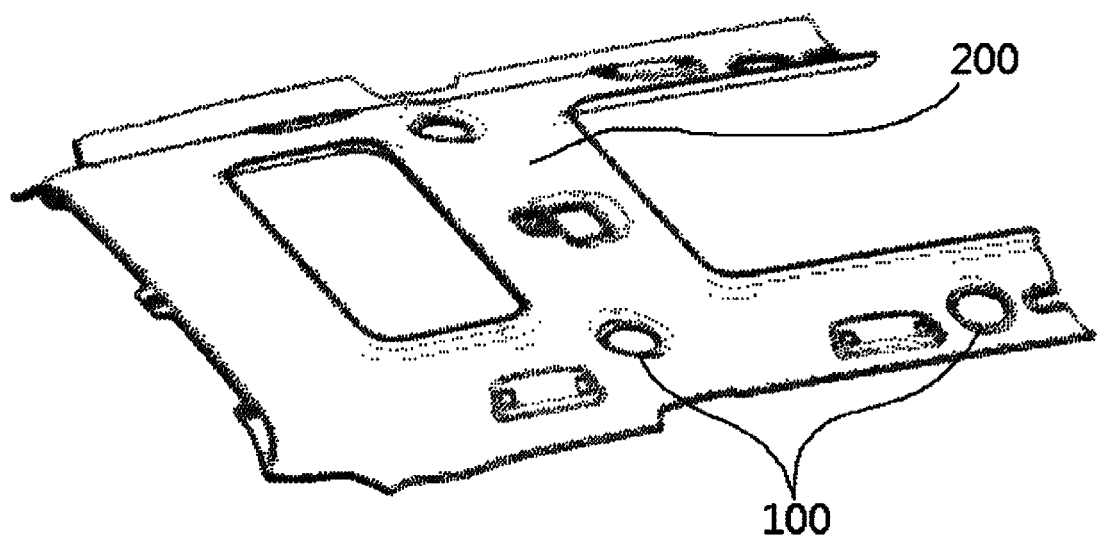
FIG. 1 is a perspective view illustrating when a roof air vent for a vehicle according to the present disclosure is mounted on a sunroof headlining.
Figure 2:
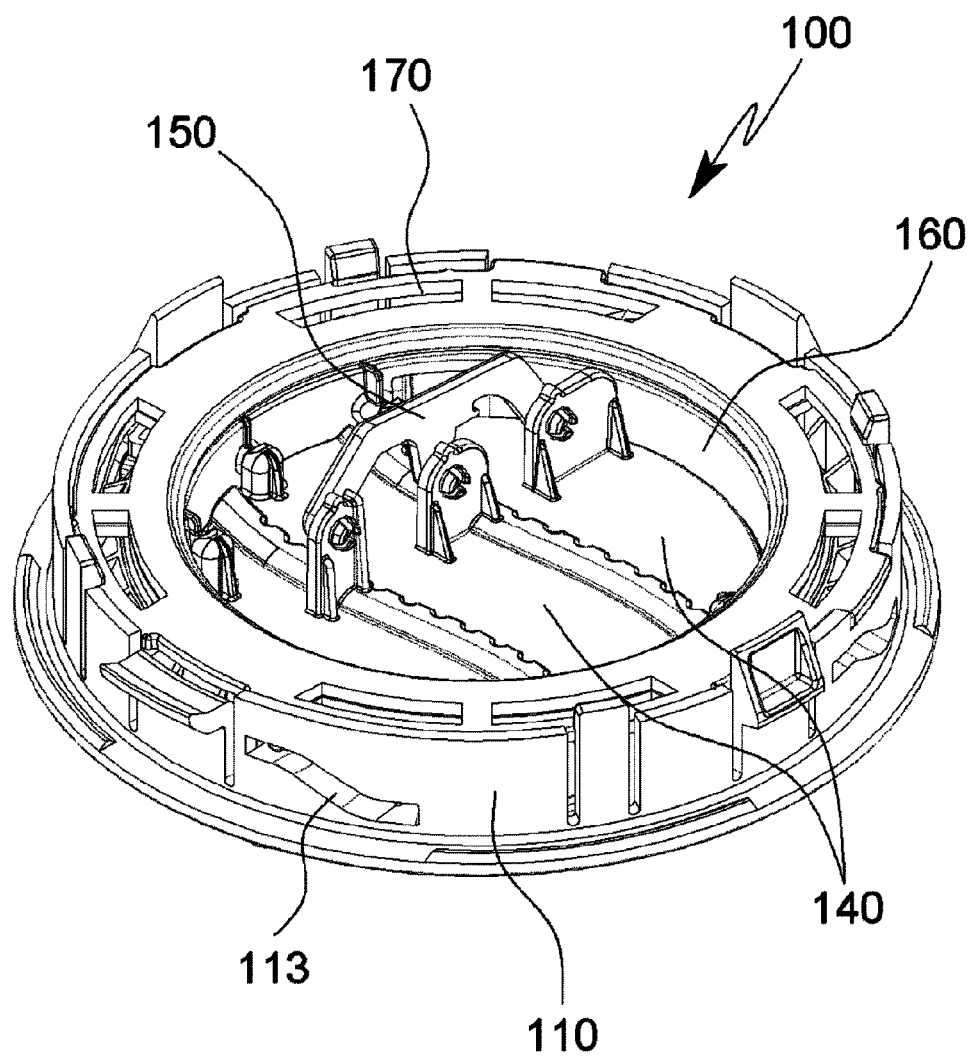
FIG. 2 is a perspective view illustrating the roof air vent for a vehicle according to the present disclosure.
Figure 3:
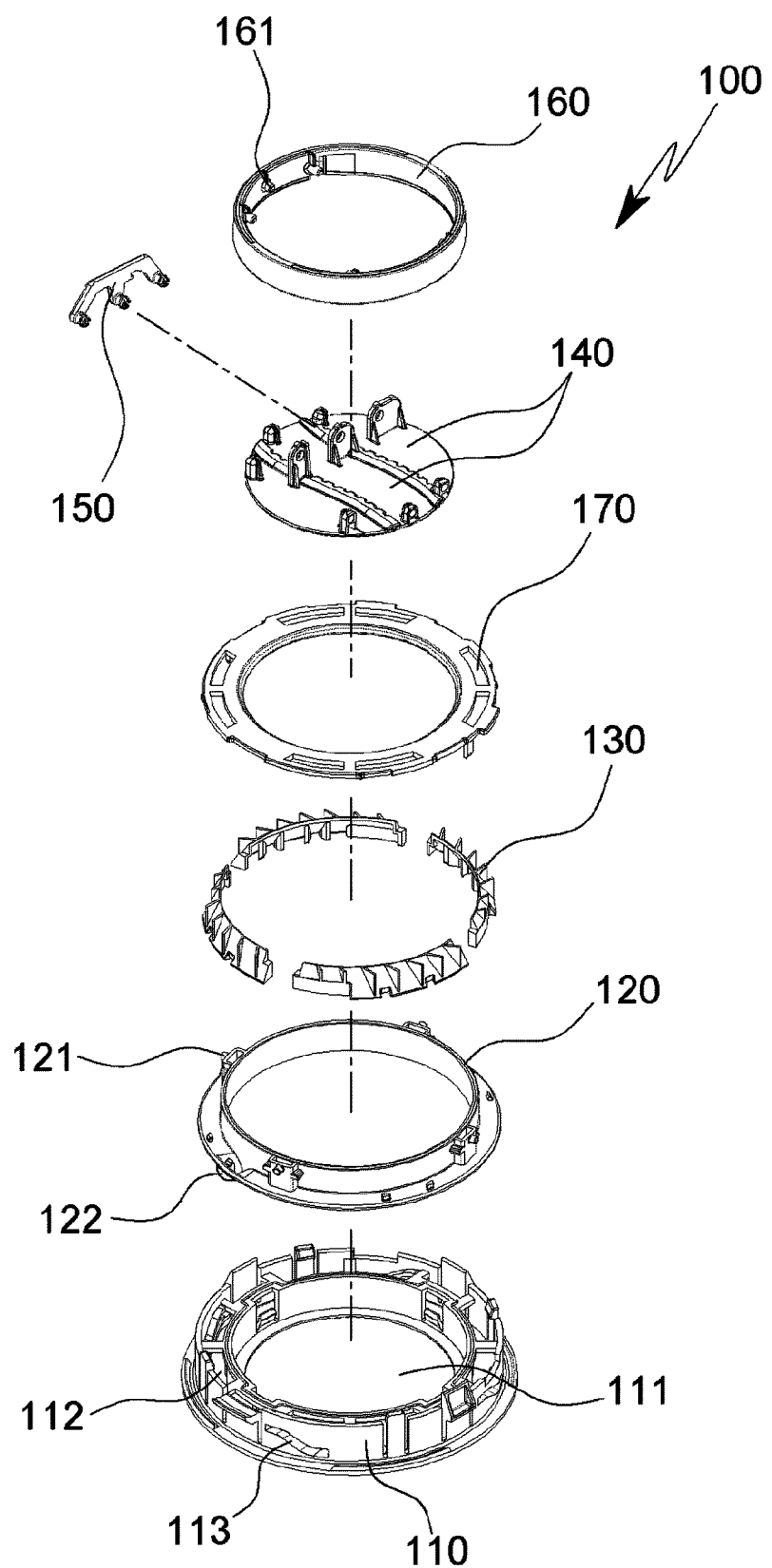
FIG. 3 is an exploded perspective view illustrating the configuration of the roof air vent for a vehicle according to the present disclosure.
Figure 4:
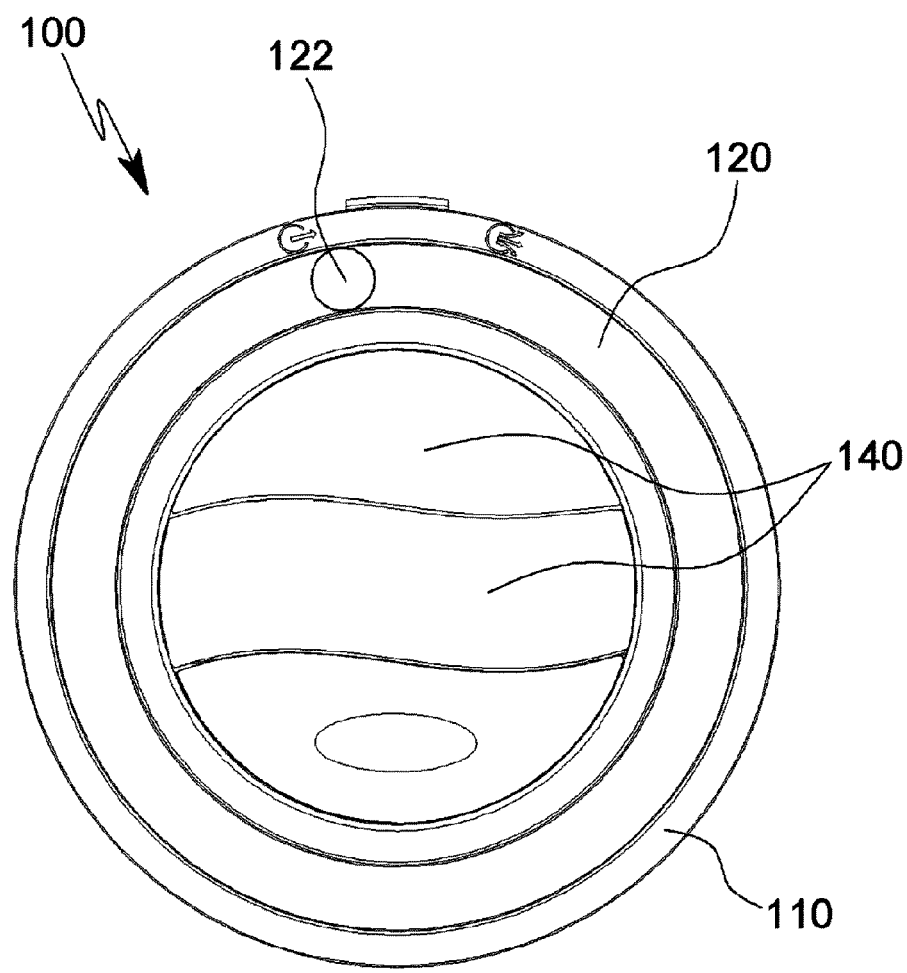
FIG. 4 is a bottom view illustrating when an inner bezel of the roof air vent for a vehicle according to the present disclosure operates in a non-diffusion state.
Figure 5:
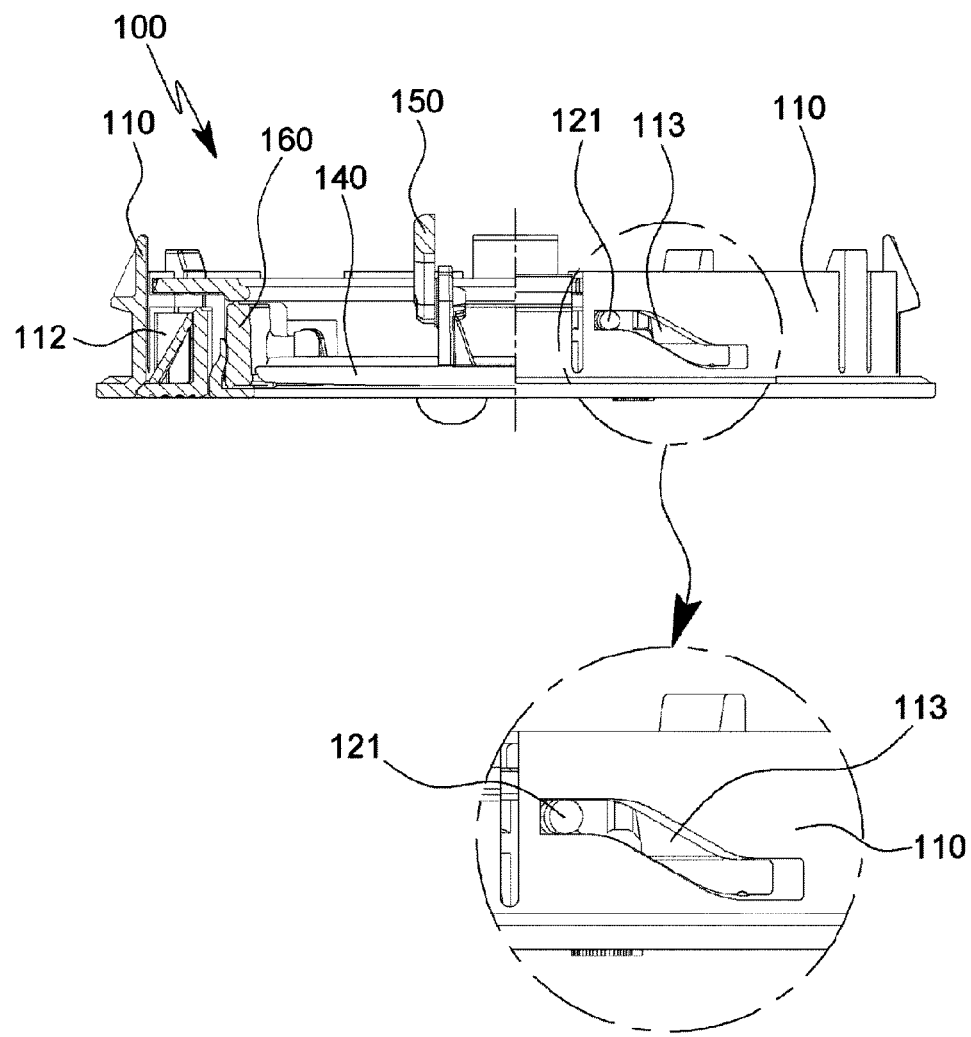
FIG. 5 is a front view showing when the inner bezel of the roof air vent for a vehicle according to the present disclosure operates in a non-diffusion state.
Figure 6:
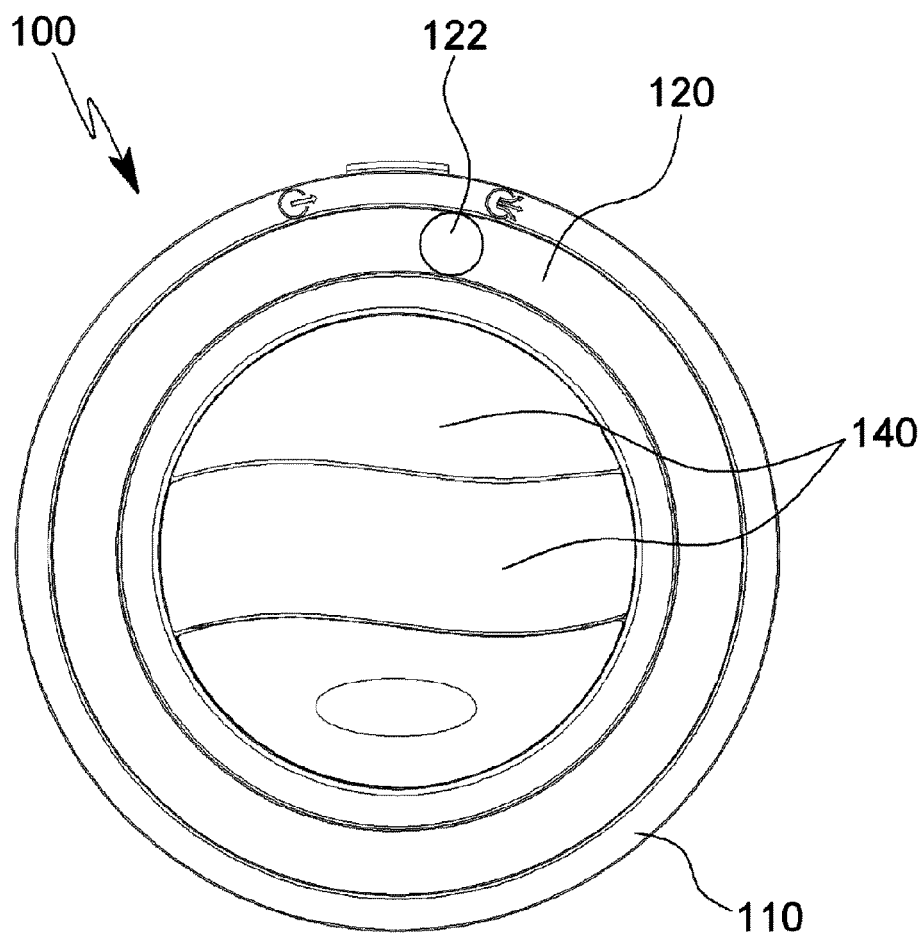
FIG. 6 is a bottom view showing when the inner bezel of the roof air vent for a vehicle according to the present disclosure operates in a diffusion state.
Figure 7:
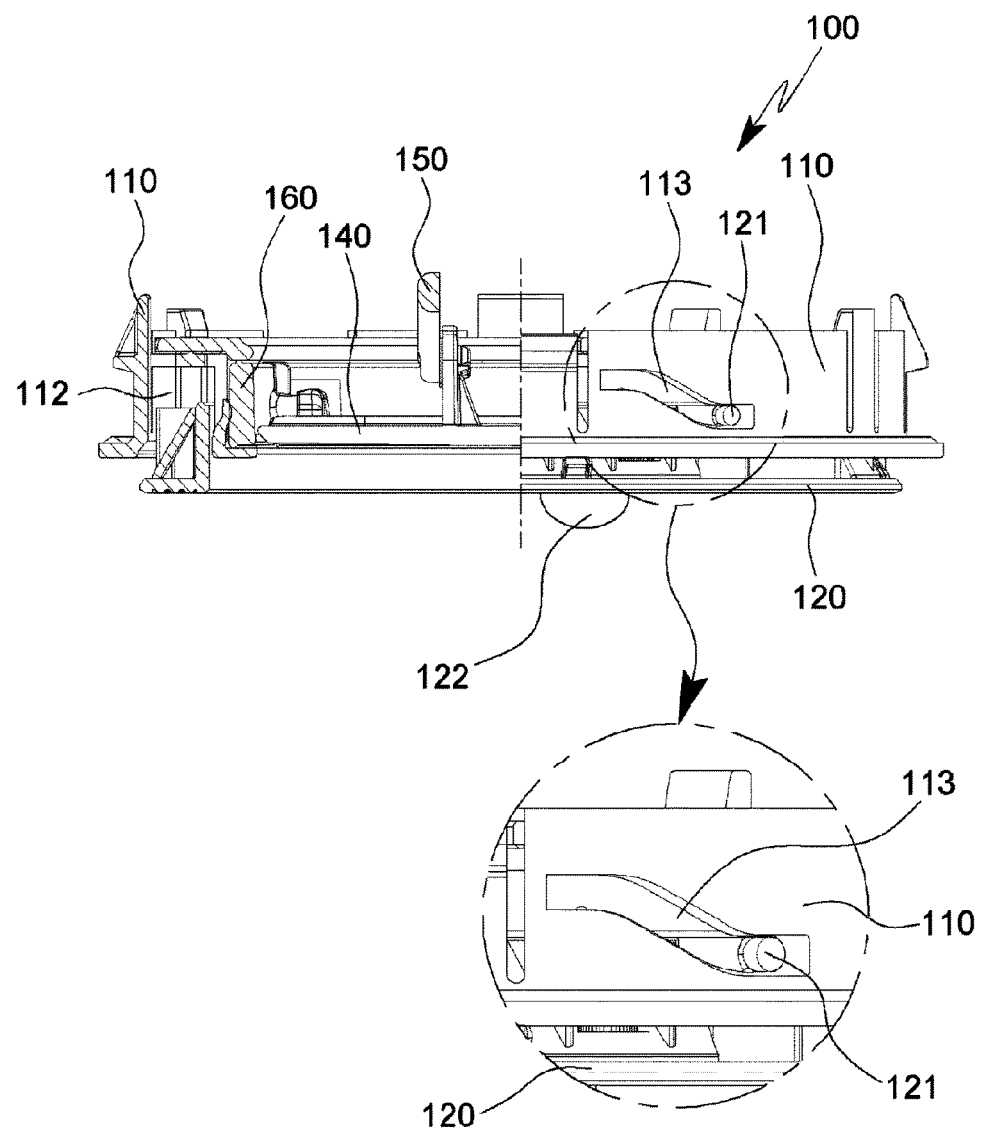
FIG. 7 is a front view illustrating when the inner bezel of the roof air vent for a vehicle according to the present disclosure operates in a diffusion state.
Figure 8:
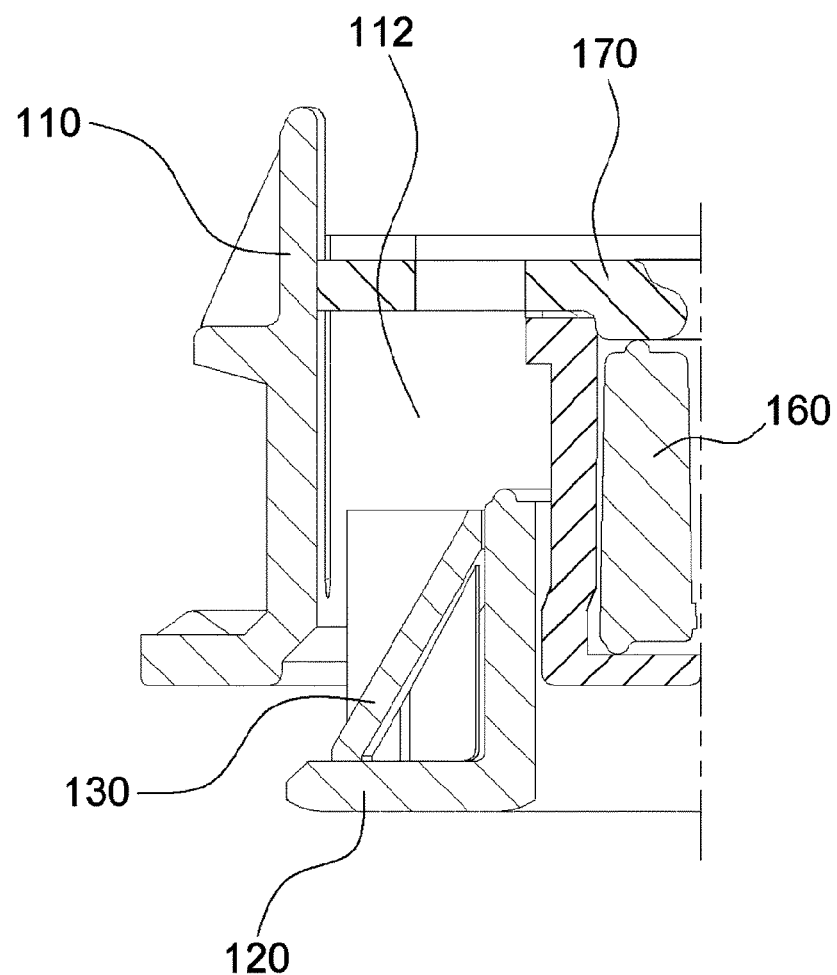
FIG. 8 is an enlarged cross-sectional view taken along line A-A' in FIG. 7.

FIG. 1 is a perspective view illustrating when a roof air vent for a vehicle of the present disclosure is mounted on a sunroof headlining, FIG. 2 is a perspective view illustrating the roof air vent for a vehicle according to the present disclosure, FIG. 3 is an exploded perspective view showing the configuration of the roof air vent for a vehicle according to the present disclosure, FIG. 4 is a bottom view showing when an inner bezel of the roof air vent for a vehicle according to the present disclosure operates in a non-diffusion state, FIG. 5 is a front view illustrating when the inner bezel of the roof air vent for a vehicle according to the present disclosure operates in a non-diffusion state, FIG. 6 is a bottom view illustrating when the inner bezel of the roof air vent for a vehicle according to the present disclosure operates in a diffusion state, and FIG. 7 is a front view showing when the inner bezel of the roof air vent for a vehicle according to the present disclosure operates in a diffusion state, and FIG. 8 is an enlarged cross-sectional view taken along line A-A' in FIG. 7.

As shown in FIGS. 1 to 8, a roof air vent for a vehicle according to the present disclosure includes an outer bezel 110, which has an air flow hole 111 penetrating the central portion of the outer bezel 110 and a mounting hole 112 in an outer region of the air flow hole 111; a spacer ring 160, which is mounted in the air flow hole 111; a plurality of vanes 140, each of which has both lateral ends rotatably coupled to a hinge shaft 161 formed on the inner surface of the spacer ring 160; a link 150, which connects one vane 140 to another vane 140 so as to allow the plurality of vanes 140 to simultaneously rotate about the hinge shaft 161; an inner bezel 120, which is mounted so as to be able to vertically enter and exit the mounting hole 112 in the outer region of the air flow hole 111; and a cover 170, which is mounted on the upper part of the outer bezel 110 so as to prevent the inner bezel 120 and the spacer ring 160 from being separated from the air flow hole 111 and the mounting hole 112, respectively.

A guide protrusion 121 is formed bulgingly in an outer region of the inner bezel 120 that vertically enters and exits the mounting hole 112, and a guide hole 113 that guides the guide protrusion 121 entering the guide hole 113 is formed to incline on the outer surface of the outer bezel 110.

In addition, a blade 130 is installed in the outer region of the inner bezel 120 having the guide protrusion 121 formed bulgingly to induce the diffusion of air.

The operation protrusion 122 is formed bulgingly on the bottom part of the inner bezel 120 that enters and exits the mounting hole 112.

In the configuration of the present disclosure described above, each of the vanes 140 has both lateral ends rotatably coupled to the hinge shaft 161 of the spacer ring 160 with each of the vanes 140 connected to another by the link 150.

The spacer ring 160, in which both lateral ends of the vanes 140 are rotatably coupled to the hinge shaft 161, enters the air flow hole 111 in the outer bezel 110.

The inner bezel 120 having the blade 130 on its outer surface for inducing air diffusion is installed in the mounting hole 112 of the outer bezel 110, in which the spacer ring 160 inserts into the air flow hole 111.

Here, the guide protrusion 121 formed on the outer surface of the inner bezel 120 inserts into the guide hole 113 inclining on the outer surface of the outer bezel 110, and the operation protrusion 122 protruding on the bottom part of the inner bezel 120 remains exposed to the outside.

After inserting the inner bezel 120 and the spacer ring 160 into the mounting hole 112 and the air flow hole 111, respectively, as described above, the cover 170 is installed on the top of the outer bezel 110 to prevent the inner bezel 120 and the spacer ring 160 from being separated from the air flow hole 111 and the mounting hole 112, respectively.

The roof air vent 100 assembled this way remains installed and fixed on the upper part of the interior of the vehicle by setting the outer bezel 110 at various locations, such as the front and back of the sunroof headlining 200.

For this reason, where the passenger in the vehicle desires to directly receive the air supplied through the roof air vent 100 installed on the sunroof headlining 200, when the passenger applies weight to the vanes 140 connected by the link 150, each of the vanes 140 rotates around the hinge shaft 161 on the spacer ring 160 to discharge air so that the air is supplied inside the vehicle through the air flow hole 111 in the outer bezel 110.

Here, the amount of rotation of the vanes 140 adjusts the amount and direction of air discharged into the interior of the vehicle through the air flow hole 111.

In addition, where the passenger on board the vehicle desires to diffuse the air discharged through the roof air vent 100 installed on the sunroof headlining 200 into the interior of the vehicle, when the passenger applies weight to the operation protrusion 122 formed bulgingly on the bottom part of the inner bezel 120 in one direction while holding the operation protrusion 122 by hand, the guide protrusion 121 on the inner bezel 120 is guided along the guide hole 113 inclining on the outer bezel 110.

The inner bezel 120 is rotated in one direction by the amount the guide protrusion 121 moves in the guide hole 113 so that the inner bezel 120 is drawn out to the lower part of the mounting hole 112.

When the inner bezel 120 is drawn out to the lower part of the mounting hole 112, the air discharges and diffuses into the interior of the vehicle through the mounting hole 112 in the outer bezel 110.

Here, the air discharged and diffusing through the mounting hole 112 into the interior of the vehicle is more widely diffused while being guided by the blade 130 installed on the outer surface of the inner bezel 120.

As described above, when the inner bezel 120 is drawn out to the lower part of the mounting hole 112 to more widely diffuse, into the interior of the vehicle, the air discharged through the mounting hole 112 in the outer bezel 110, the inner bezel 120 remains protruding downward so that the passenger conveniently changes the air supplied to the interior of the vehicle through the roof air vent 100 into a diffusion state or a non-diffusion state, while visually identifying the air diffusion state.

The present disclosure is not limited to the specific preferred embodiments described herein, and various modified embodiments may be made by those of ordinary skill in the art to which the invention pertains without departing from the gist of the invention as claimed in the claims. Such modifications are intended to be within the scope of the claims.

The invention claimed is:

1. A roof air vent for a vehicle, the roof air vent comprising:
 an outer bezel, which has an air flow hole penetrating the central portion thereof and has a mounting hole penetrated in an outer region of the air flow hole;
 a spacer ring, which is mounted in the air flow hole;
 a plurality of vanes, each of which has both lateral ends rotatably coupled to a hinge shaft formed on the inner surface of the spacer ring;
 a link, which connects one vane to another vane so as to allow the plurality of vanes to simultaneously rotate about the hinge shaft;
 an inner bezel, which is mounted so as to be able to vertically enter and exit the mounting hole formed in the outer region of the air flow hole; and
 a cover, which is mounted on the upper part of the outer bezel so as to prevent the inner bezel and the spacer ring from being separated from the air flow hole and the mounting hole, respectively;
 wherein a guide protrusion formed bulgingly is on the outer surface of the inner bezel, which vertically enters and exits the mounting hole, and a guide hole, which guides the guide protrusion entering the guide hole, is formed to incline on the outer surface of the outer bezel.

2. The roof air vent of claim 1, wherein a blade for introducing air diffusion is installed on the outer surface of the inner bezel having the guide protrusion formed bulgingly.

3. The roof air vent of claim 1, wherein an operation protrusion is formed bulgingly on the bottom of the inner bezel, which enters and exits the mounting hole.

* * * * *